United States Patent [19]

Sekine et al.

[11] 4,332,012

[45] May 25, 1982

[54] CONTROL SYSTEM FOR AUTOMOTIVE VEHICLE COMPONENT ASSEMBLY LINES

[75] Inventors: Yoshitada Sekine, Ome; Hiroshi Imaizumi, Yokohama; Shoji Katagi, Musashimurayama; Kazunori Obata, Tokyo; Kazuyoshi Abe, Hoya; Hisashi Shimizu, Akikawa, all of Japan

[73] Assignee: Nissan Motor Company, Limited, Kanagawa, Japan

[21] Appl. No.: 96,230

[22] Filed: Nov. 20, 1979

[30] Foreign Application Priority Data

Nov. 27, 1978 [JP] Japan .................. 53-147041

[51] Int. Cl.³ .................. G06K 7/10; B07C 3/14
[52] U.S. Cl. .................. 364/468; 209/552
[58] Field of Search .................. 364/468, 424, 425; 209/552, 546, 576, 579

[56] References Cited

U.S. PATENT DOCUMENTS

| | | | |
|---|---|---|---|
| 3,639,728 | 2/1972 | Helfand et al. | 364/478 |
| 3,645,391 | 2/1972 | Hirakawa et al. | 209/73 |
| 3,688,087 | 8/1972 | Howard et al. | 364/478 X |
| 3,864,559 | 2/1975 | Mori et al. | 364/478 |
| 4,047,000 | 9/1977 | Bryant et al. | 364/468 |
| 4,053,741 | 10/1977 | Ainoya et al. | 364/478 |
| 4,121,818 | 10/1978 | Riley et al. | 364/478 X |

FOREIGN PATENT DOCUMENTS

| | | |
|---|---|---|
| 1202361 | 8/1970 | United Kingdom . |
| 1248069 | 9/1971 | United Kingdom . |
| 1254445 | 11/1971 | United Kingdom . |
| 1254446 | 11/1971 | United Kingdom . |
| 1254447 | 11/1971 | United Kingdom . |
| 1473016 | 5/1976 | United Kingdom . |
| 1473167 | 5/1977 | United Kingdom . |

OTHER PUBLICATIONS

Conveyer System with an Automatic Selection Unit for the Computer-Controlled Availability of Engines and Axles in the Final Assembly of Automobiles; Siemens-Zeitschrift, Jul. 1971, vol. 7, pp. 460-468, by Rath et al.

Automatic Identification of Moving Objects; Welker, Journal "Fordern und Heben", 1978, pp. 103-104.

Primary Examiner—Edward J. Wise
Attorney, Agent, or Firm—Lowe, King, Price & Becker

[57] ABSTRACT

Control of an automotive vehicle component assembling system having one or more series of assembly lines used in common for assembling various models, standards and/or specifications of vehicle component is provided by converting information and instructions relating to various models, standards and/or specifications of vehicle component into a sign. The sign is fitted onto one of the part of the component. Information and instructions from the sign are detected automatically to control picking up of parts and assembling operations in each assembly line.

41 Claims, 18 Drawing Figures

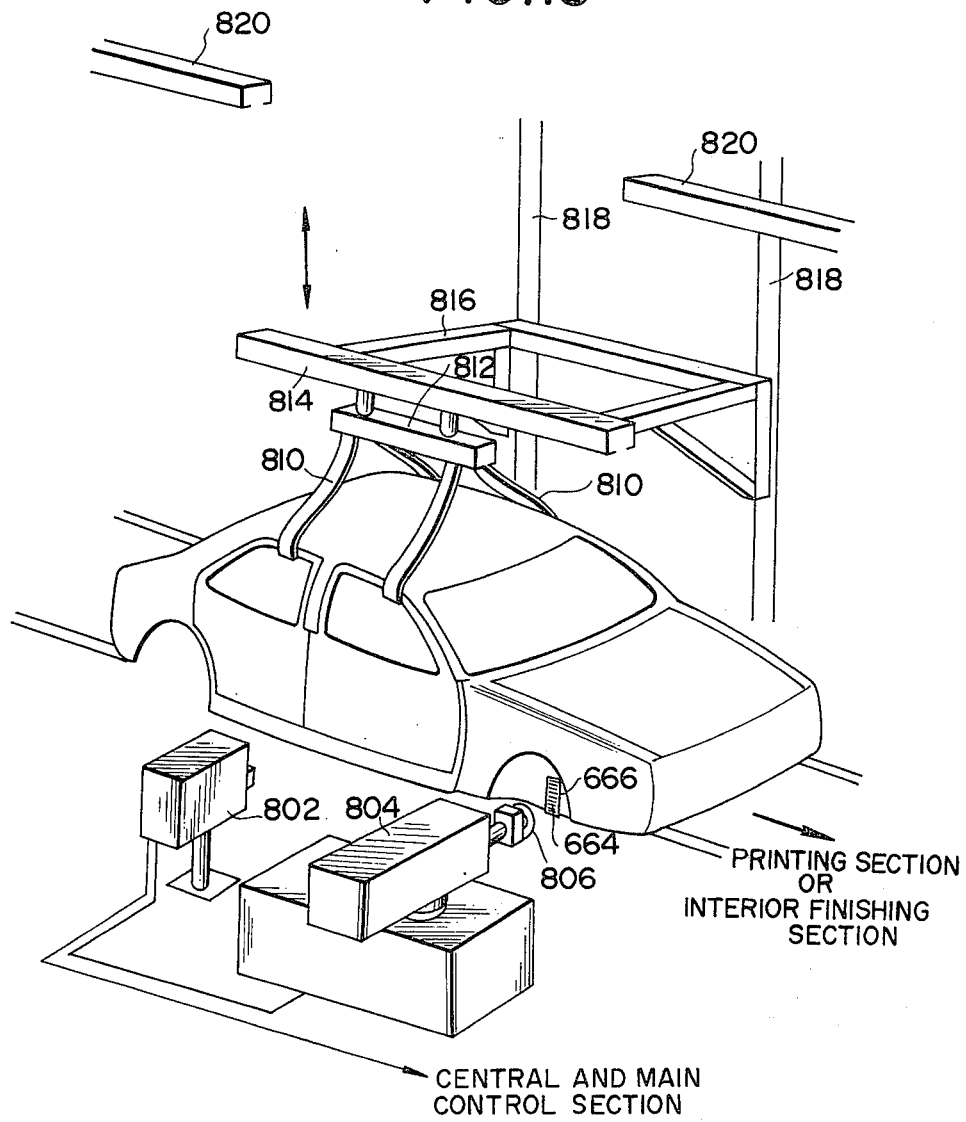

CONTROL SYSTEM FOR AUTOMOTIVE VEHICLE COMPONENT ASSEMBLY LINES

BACKGROUND OF THE INVENTION

The present invention generally relates to an system for and method of assembling automotive vehicle components. The invention particularly relates to a system for and method of controlling assembling of automotive vehicle components, in which at least one series of assembly lines is used in common for assembling various models and/or specifications of vehicles. More specifically, the invention relates to a system for and method of controlling an assembling system having at least one assembly line for vehicle bodies used as a common assembly line for assembling various models and/or specifications of vehicle bodies.

In automotive vehicle factories, series common assembly lines are used for assembling various models and/or specifications of automotive vehicle components. For example, in lines for assembling various models and/or specifications of vehicle bodies, there is a series including at least a common floor assembly line, a body assembly line and a body assembly finishing line for assembling various models and/or specifications of vehicle bodies. Generally, the series of assembly lines includes a special treatment line for vehicle bodies having special specifications. Such vehicle body assembling systems have used instruction papers containing information and instructions for selecting the line to be used, necessary parts, and processing procedures in accordance with production schedules or plans for the automotive vehicle components. The instruction papers are delivered to each assembly line in the system. On each line, workers sequentially arrange the respective parts which are applied to respective models and specifications of vehicle bodies, according to the instructions in the instruction papers, and operate assembling machines employed in the line to carry out the assembling operations. After finishing the assembling operation required in the line, the workers select the next line to process each specified model and vehicle body specifications and send the vehicle thereto according to the instruction papers.

However, in such system, where the workers of each assembly line previously arrange the parts to be assembled into the vehicle body in order, according to the instructions contained in the instruction paper, it is necessary to check the model and vehicle body specifications forwarded from the prior line, to see whether or not the model of the vehicle body forwarded is correct relative to the instructions.

Thereafter, the assembling operation is performed in accordance with the instructions contained in the instruction paper. After completing the required assembling operation, the workers in the line again check the assembly to confirm that the correct parts are being assembled and that the operations are correct. The assembly is then forwarded to succeeding lines, selected according to the instruction papers. Such checking must be made in each of the assembly lines, resulting in inefficiency of assembling system of the vehicle bodies.

Further, in the vehicle body assembly lines, there may often arise a necessity to force a body of unexpected models and specifications out of the order contained in the instruction papers into the line. Such necessity may arise, for example, by a new and special order from the customer. In such a situation, the special order vehicle body is often assembled prior to standard models and specifications of vehicle bodies to comply with the customer's request. Such special vehicles are thus entered into the assembly lines out of the order defined in the instruction papers. In this case the workers are required to visually detect or find such a vehicle body, before directing it into the assembling operation.

When the workers detect or find the aforementioned special models and specifications for the vehicle body, they must arrange respective parts to be applied thereto and perform the assembling operation in accordance with the procedure or specification designated in the specific vehicle body. In this case, serious confusion may occur to each assembly line. Further, if some assembly lines neglect to detect or find that the vehicle bodies are not of the instructions in the instruction papers and continue the assembling operation according to the instruction papers, unacceptable vehicle bodies may be produced.

To avoid such mis-assembling, that the workers of each line must detect the models and specifications of the vehicle bodies to be assembled and compare the same with that designated in the instruction papers for confirmation. Thereafter, each part to be assembled in the line is selected and used in the assembling operation, according to the specification and procedures included in the instruction papers.

In such conventional systems, it is required for each worker to possess an ability to distinguish the models of the vehicle bodies which are forwarded, in practice, to the assembly line one by one. It is difficult to distinguish slight differences in specifications of the vehicle bodies, at a glance. As a result, the assembling operation may be rather slow, resulting in inefficiency and low-productivity of the assembly line. The level of the labor skill must also be higher in order to reliably distinguish and recognize the various types of informations. Serious problems may arise due to the lack and high cost of skilled laborers.

In such a conventional system, since, distinguishing of the models and/or specification of the vehicle bodies relies upon the ability of human labor, the workers' energy might be unnecessarily exhausted. This may also cause possible mistakes in distinguishing the models and specifications of the body and of assembling operations.

In recent years, there has been provided a centralized computer control system for assembly lines, such a system being called a "tracking system". In this system, the instruction papers are replaced by instructions and information derived from the computer.

Information relative to the order of the vehicle bodies to be worked on by the assembly lines, models and specifications of respective bodies, necessary parts, order of processing and so on are supplied to the computer. The computer generates information and instruction signals which are fed to the respective areas.

To provide sufficient and sucessful controlling operations, large, high capacity computers are required which may significantly increase the cost of the assembly facilities. Further, employment of large computers may also require incidental facilities, for example an air-conditioning system.

Although the computerized controlling system for assembly lines can reduce the responsibility of the workers and can raise reliability of operation, it is still complicated with the computer system to keep track of changes in the order of assembling the bodies which may be caused by forcing in or taking out a body unexpectedly. Namely, if the necessity for forcing in or taking out of a special model, standard and/or specifications of the vehicle body arises, the instruction or information signal should be fed back to the computer to correct stored information therein. Therefore, the computer in the prior system cannot respond to a change in a given order according to a previous input order.

By using a larger or more complicated computer system for controlling the assmbly lines, it may be possible to improve efficiency of the assembling operation. However, one can also expected increased costs for the computer itself and its facilities, as well as complicated operation. Further, in such a computerized controlling system, if there is some accident or damage even at one terminal of the system, the accident or damage affects the whole system. Furthermore, if damage, accident or malfunction occurs inside the computer, all the assembly lines are stopped.

The present invention removes the aforementioned disadvantages or inconveniences in the prior control systems by including all the necessary information and instructions with respect to a model standard and/or specifications of the vehicle body on the respective vehicle bodies, thereby making it possible to respond easily to any change of a given order for performing an assembling operation.

SUMMARY OF THE INVENTION

Therefore, it is an object of the present invention to provide a system for and method of controlling automotive vehicle component assembly lines capable of responding to any change and accurately controlling the respective assembly lines.

Another object of the present invention is to provide a control system and method for a vehicle component assembling system capable of supplying necessary information and instructions for assembling vehicle components without being adversely influenced by any change in a given order.

Still another object of the present invention is to provide a control system and method for reducing or saving expenses for a vehicle component assembling system.

To accomplish the above-mentioned objects, there is provided, in accordance with the present invention, there is provided a system and method for controlling an automotive vehicle component assembling system having one or more assembly lines which is used in common for assembling various models, standard and/or specifications of vehicle components. The assembly lines can be floor assembly lines, body assembly lines and/or additional equipment assembly lines. The control system comprises a first means for converting information and instructions relating to various models, standard and/or specifications of vehicles into a sign. A second means attaches said sign onto one part of the vehicle componet. A third means obtains necessary information and instructions from said sign and converts the sign into control signals for controlling assembling operations in the line.

BRIEF DESCRIPTION OF THE DRAWINGS

The present invention will be more fully understood from the detailed description given below, and from the accompanying description of one preferred embodiment of the present invention, which however, is not to be taken as limitative of the present invention in any way, but is for the purpose of elucidation and explanation only.

In the drawings:

FIG. 18 is a schematic perspective view of a checking section.

DESCRIPTION OF THE PREFERRED EMBODIMENT

Figure 1:
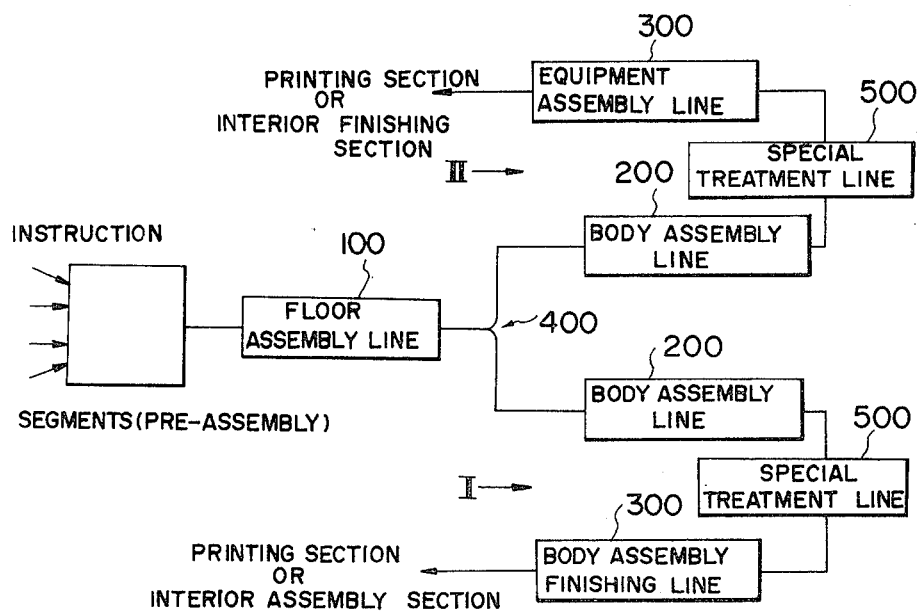
FIG. 1 is a schematic block diagram for the a general construction of a vehicle body assembling system.
Figure 2:
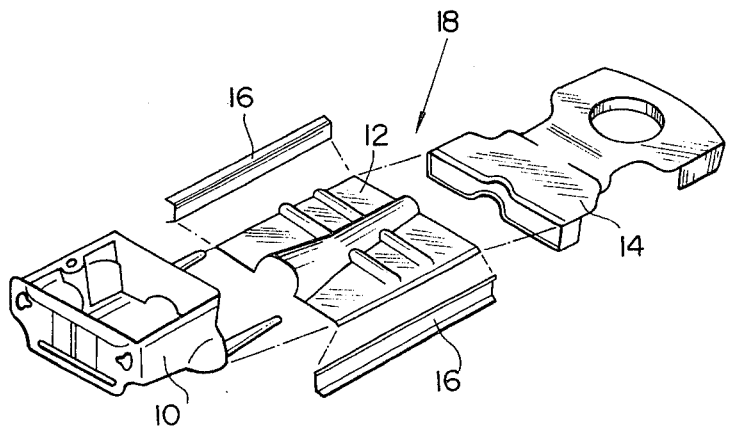
FIG. 2 is a schematic exploded perspective view of parts assembled into a floor assembly in the floor assmbly line of FIG. 1.
Figure 3:
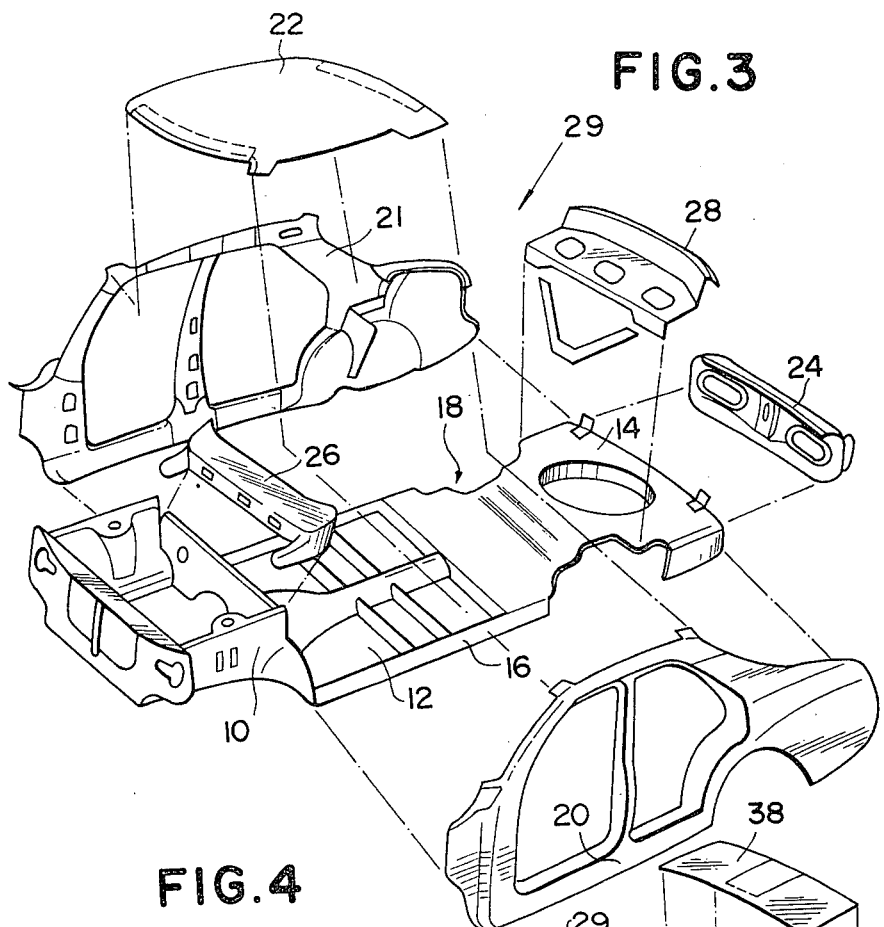
FIG. 3 is a schematic exploded perspective view of parts assembled to the floor assembly in the body assembly line in FIG. 1.
Figure 4:
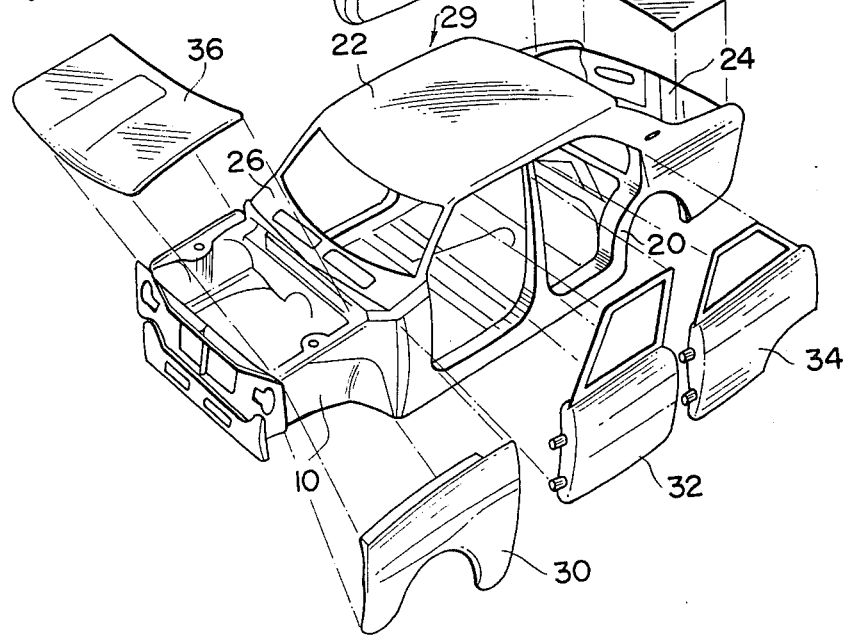
FIG. 4 is a schematic exploded perspective view of parts assembled to the body assembly in the additional equipment assembly line of FIG. 1.

Referring now to the drawings, particularly to FIG. 1, there is schematically illustrated a general vehicle body assembling system. The assembling system has a plurality of assembly lines through which the various models, standard and/or specifications of vehicle bodies are assembled. The assembling system generally comprises two series of a first floor assembly line 100 in which, generally, floor members of the vehicle bodies are assembled into a floor assembly (as shown in FIG. 2), a second body assembly line 200 in which, generally, main body members of the vehicle bodies are assembled to the floor assembly and into a body assembly (as shown in FIG. 3) and a third body assembly finishing line 300 in which additional parts of the vehicle bodies are assembled to the body assembly, (as shown in FIG. 4) thus completing the assembling process.

It should be noted that, in the present application, respective assembly lines 100, 200 and 300 are organized in a known manner. Therefore, that the organization and construction of each assembly line 100, 200 and 300 are not essential features with respect to the invention. In the present specification, since each of lines 100, 200 and 300 is a part of a known vehicle body assembling system, each assembly line 100, 200 or 300 may not be illustrated in detailed construction and operation; thus the construction and operation of each line should not be understood to cause any limitation on this application.

As shown in FIG. 1, at the downstream end of the floor assembling line 100, there are provided separate lines I, II diverging from a junction 400. The vehicle bodies are selectively forwarded to one of the series of lines I, II through point switching means 400 of a conveyor; selection of line I or II corresponds to models and/or specifications so as to be assembled into the vehicle body as designated. While FIG. 1 includes two series of assembly lines, it should be understood that two lines are shown merely as an example to illustrate the invention. The number of lines may be increased or decreased as desired.

Between the body assembly line 200 and the body assembly finishing line 300, there is provided, in series, a line 500 in which is performed special treatment, for example forming apertures for bodies of special models and/or specifications. As shown in FIG. 2, in the floor assembly line 1, front body member 10, front floor panel 12 rear floor panel 14 and side members 16 are assembled into a floor assembly 18. The floor assembly 18 is shown in FIG. 3. The respective parts of the floor assemblies 18 vary corresponding to the models and/or specifications of vehicles. Each part is checked for appropriateness to the specified model, specifications and/or standard of the vehicle body to be assembled. In practice such checking is performed before and after the assembling operation for each part in the floor assembly 18.

The floor main assembly 18 is forwarded through a conveyor line of respective series I, II to the body assembly line 200. The floor assembly 18 is selectively forwarded through the conveyor lines of the series I, II corresponding to the model and/or specifications of vehicle to be assembled. As shown in FIG. 3, body side panels 20, 21, roof panel 22, real panel 24, cowl assembly 26 and parcel-shelf 28 are assembled to the floor assembly 18 in the body assembly line 200 in the series. The body side panels 20, 21 roof panel 22, cowl assembly 26 and parcel-shelf 28 comprise, together with the floor assembly 18, a body assembly 29. The cowl assembly 26 is often assembled with the dash box member, as a subassembly. The main body assembly 29, shown in FIG. 4, is assembled in the body assembly line 200, where the illustrated parts are assembled together with the body assembly 18. On the body assembling line 200, respective parts assembled to the floor assembly 18, to form the body assembly 29, are varied according to the models and/or specifications of the vehicles. At the second line 200, each part assembled to the floor assembly 18 is checked for the model and/or specifications of the vehicle body to be assembled before being assembled together with the body side panels 20, 21 into the main body assembly 29.

The main body assembly 29 is forwarded through the line 500 to the body assembly finishing line 300. As shown in FIG. 4, on the body assembly finishing line 300, a front fender member 30, a pair of front door members 32, a pair of rear door members 34, a hood member 36 and a trunk lid member 38 are assembled to the main body assembly 29 of the vehicle body.

Thus, a vehicle body of a specified model and specification is assembled through a series of assembly lines.

If the vehicle body requires special treatment in accordance with the specifications, the special treatment according to an instruction contained in the specification is performed in the line 500. In this line, special treatment, for example forming apertures at specified positions or assembling special equipment, is performed.

Referring now to FIGS. 5 to 18, in which are illustrated a preferred system for embodying the vehicle body assembling system according to the present invention. Since the constitution of each line in the series II is substantially the same as that of the series I, the series II is omitted in FIG. 5.

Figure 5:
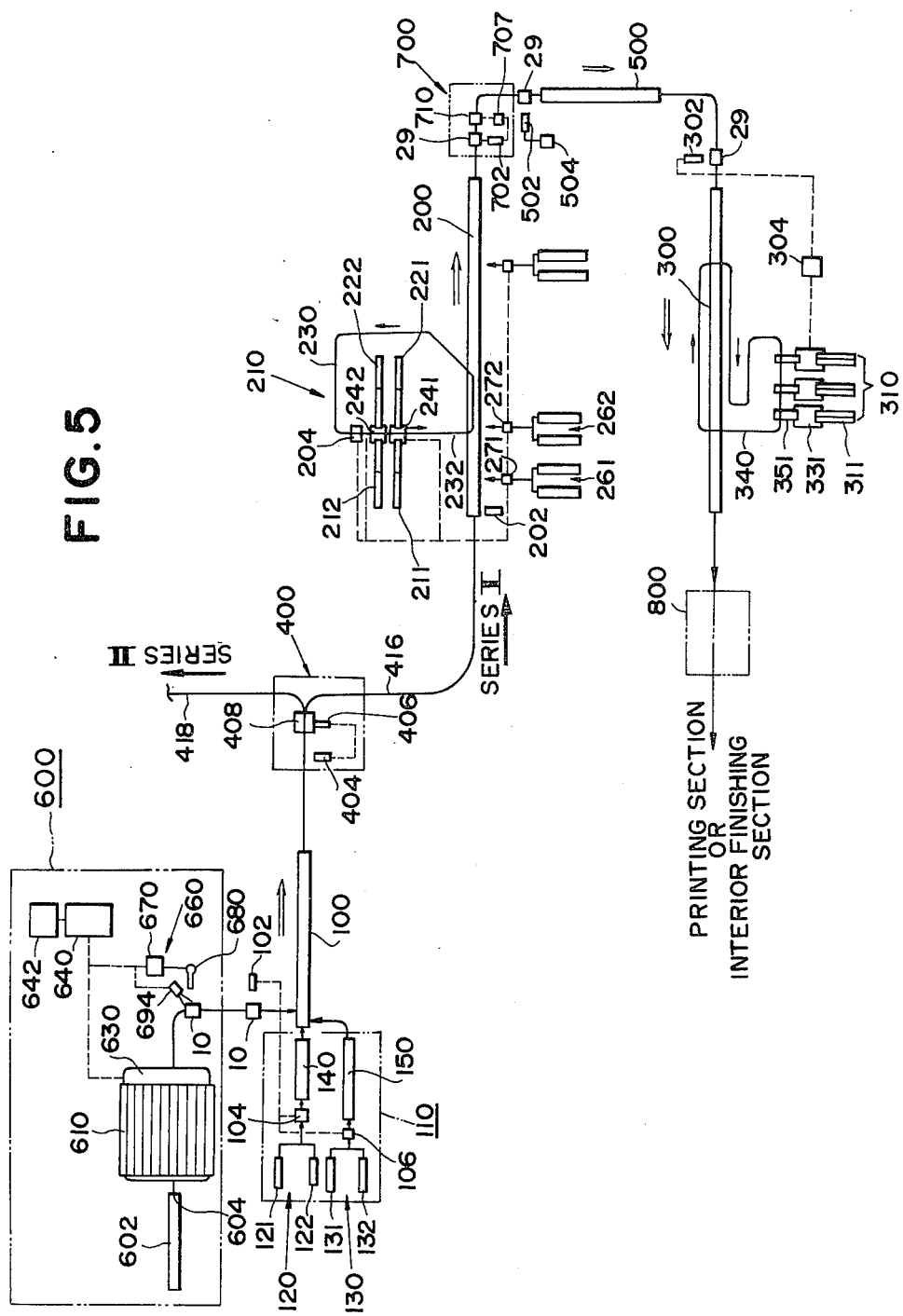
FIG. 5 is an illustration of an arrangement of each line and sections comprising a control system according to the preferred embodiment of the present invention for a vehicle body assembling system.
Figure 6:
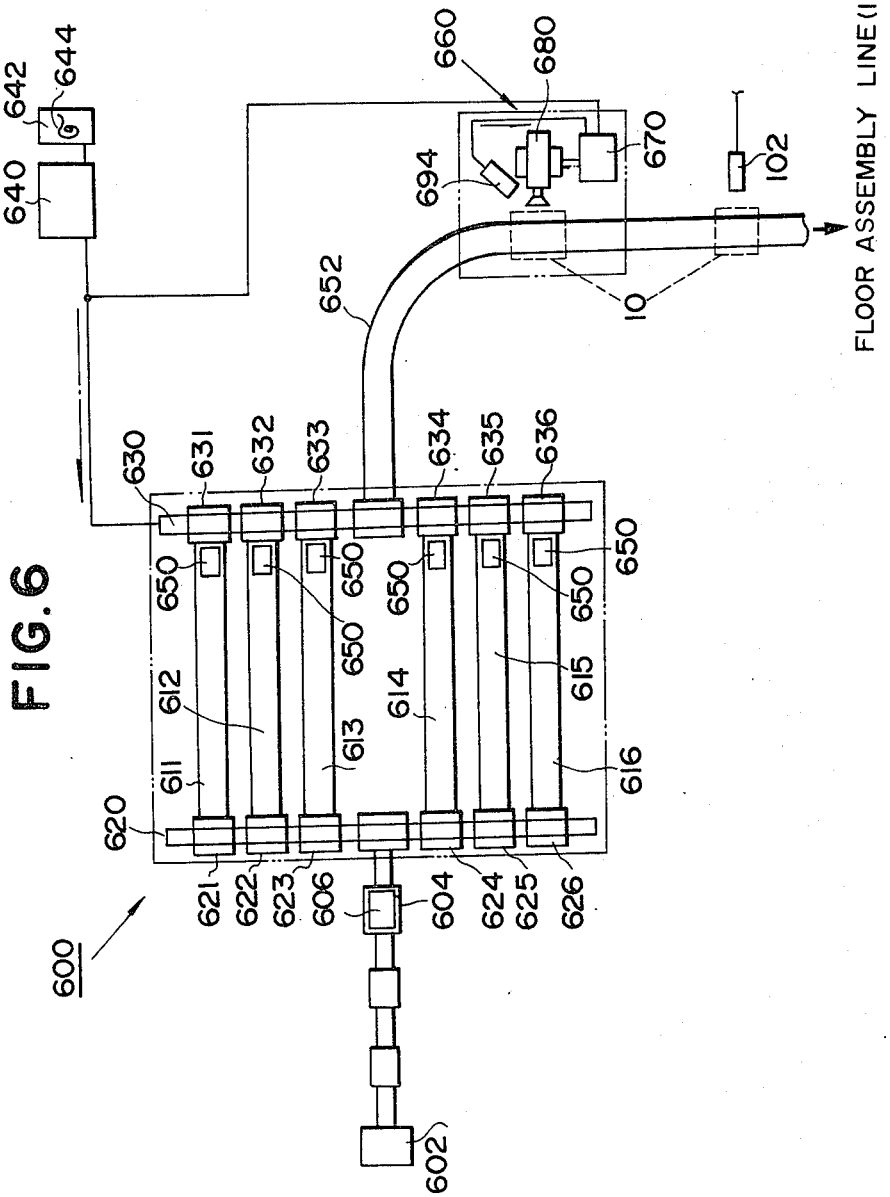
FIG. 6 is an enlarged partial illustration of a labelling section of the control system of FIG. 5.
Figure 7:
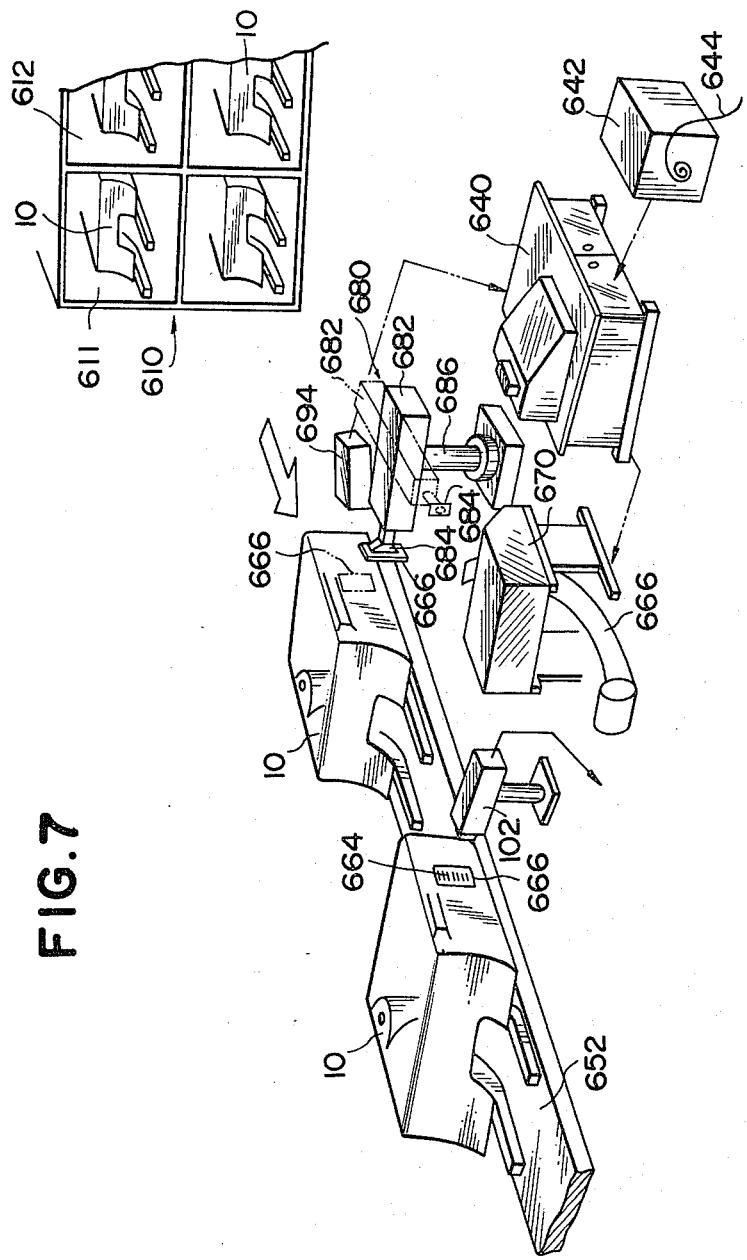
FIG. 7 is a schematic perspective view of the labelling section of FIG. 6.

As shown in FIGS. 5 to 7, upstream of the floor assembly line 100, there is provided a section 600 including a pre-assembly line 602 for assembling the front body members 10. The front body members 10 assembled in the line 602 are forwarded to a storage section 610 to be stored therein. Upon forwarding to the storage section 610, the front body members 10 are separated and sorted into respective models, standards and/or specifications at an outlet 604 of each line 602 in which a device 606 for sorting front body members into respective models and/or specifications is provided. As shown in FIGS. 6 and 7, the storage section 610 is divided into a plurality of storage rooms 611 to 616 in which respective models of front body members 10 sorted by the sorting device 606 are stored in respective rooms corresponding to models, standards and/or specifications by a lifter device 620 having a plurality of lifters 621 to 626.

Lifter device 620 is controlled by a control signal generated by the sorting device 606 to lift respective front body members 10 to designated storage rooms corresponding to the decision made by the srting device 606. In practice, it can be expected that, the sorting device 606 separates the models of the front body member 10 in various ways. For example, such separation of the models of the front body members 10 can be carried out by a photoelectric tube or limit switch detecting the length of the member 10 or position, size or existence of apertures formed on the member 10.

The front body members 10 sorted in the storage rooms 611 to 616 are selectively removed the rooms 611 to 616 by one of a plurality of lifters 631 to 636 of a lifter device 630. The lifter device 630 is controlled by a control signal generated by a controller 640.

The controller 640 generates control signals corresponding to input signals generated by a tape-reader 642 electrically connected to the controller 640. Into the tape-reader 642, an instruction tape 644 made according to information or instructions for assembling the vehicle bodies corresponding to designated models and/or specifications of the vehicle is supplied. Tape 644 contains the instructions or information in instruction papers used in the conventional assembling systems.

As shown in FIG. 6, at the outlet of each of storage rooms 611 to 616, there is provided a device 650 for sorting the front body members 10 to be taken out by the lifter device 630. The sorting device 650 confirms that the front body member 10 to be taken out is the designated front body member. After confirmation of the correct front body member, the lifter device 630 operates one of lifters 631 to 636 to take out the appropriate member 10. The front body member 10 taken out from one of the storage rooms 611 to 616 is forwarded to the first line 100 through a conveying device 652 such as a belt conveyor.

As shown in FIGS. 5 and 6, between the storage section 610 and the floor assembly line 100, there is provided a section 660 for labelling on the front side portions of the front body members 10. The labelling section 660 generally comprises a printer 670 electrically connected to the controller 640, for printing codes 664 (FIGS. 7 and 9) on labels 666 (FIGS. 7–9), and a device 680 for sticking the label 666 on the front side portions of the front body member 10.

It should be understood that the label 666 may be placed anywhere on the vehicle body and, therefore, the following description in which the label 666 is placed on the front side portion of the front body member, does not affect this invention as a limiting feature. Further, the label may be stuck on any other part of the floor assembly. When the label is stuck on the other parts, the labelling section 660 should be located corresponding to the parts supplying section through which parts to receive the label are forwarded. Furthermore, it is also expected that the labelling may be performed in other assembly lines as necessary.

Figure 8:
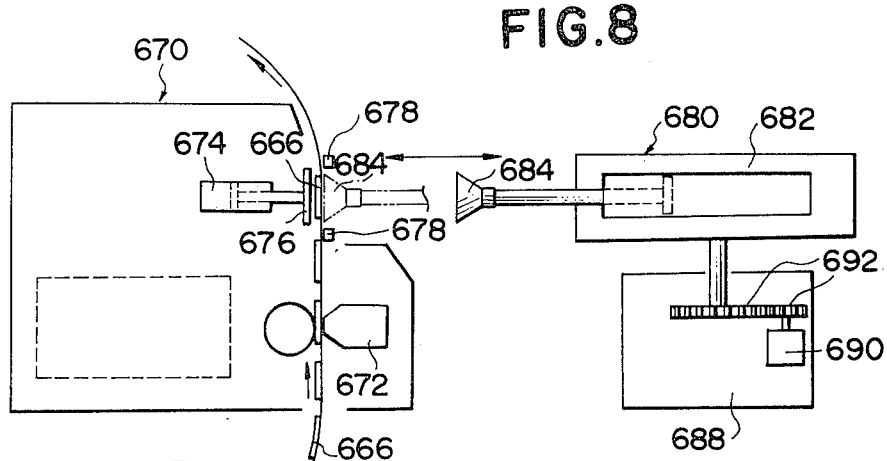
FIG. 8 is a partly sectioned schematic side elevational view of a printing and a sticking device in the labelling section of FIG. 6.

As shown in FIGS. 7 and 8, the printer 670 comprises a printing head 672 printing a code 664 on the label 666 corresponding to a control signal generated by the controller 640, and a plunger 674 having a head 676 movable to and fro with respect to a cutter edge 678 opposite to the head 676.

In practice, the code 664 may be formed in various ways. However, in the preferred embodiment, the code 664 consists of a plurality of lines having varying thicknesses and which are arranged to from a specific sign involving assembling instructions corresponding to the control signal, as shown in FIG. 9.

Figure 9:
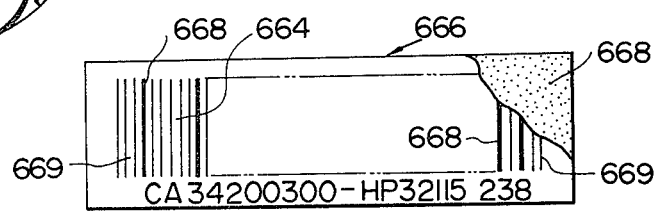
FIG. 9 is an enlarged front elevational view of a label applied in a preferred embodiment of the invention.

As shown in FIG. 9, the label 666 is in the form of a series of parallel lines or bars 669. After printing a code 664, the label 666 is cut to the desired size and shaped by moving the plunger head 676 toward the cutter edge 678 so the the head enters the interior clearance of the cutter edge.

The printer 672 and the plunger 674 are operated in synchronism with one another with a given timing so as to make a label 666 having a code 664 in exact form, as shown in FIG. 9.

A sticking device 680 for label 666 comprises a plunger 682 having a head 684. Device 680 is pivoted at supporting shaft 686 so as to rotate about the shaft 686 in a substantially horizontal direction, and includes a driving means 688 having a motor 690 and gears 692. The plunger head 684 is movable to and fro with respect to the printer 670 and with respect to the front body member 10. At the position opposite to the printer 670, the plunger head 684 can enter into the interior clearance of cutter edge 678 to take out the label 666.

Preferably, the back side of label 666 is provided with a magnetic member 668, as shown in FIG. 9. In one preferred construction, the magnetic member 668 is a rubber sheet composed of a magnetic material. The plunger head 684 is made of magnetic material to attract the label onto it by magnetic attraction. Head 684 brings label 666 to the front body member 10 that is being transported on the conveying device 652. The motion of sticking device 680 is synchronized to the printer 670 so that the plunger head 684 of the sticking device 680 can take out the label 666 by magnetic attraction between the label 666 and head 684. The head 684 then moves away from the printer 670, and rotates toward the front body member 10. By driving the motor 690, the plunger 682 is rotated through an acute angle to face the front side portion of the front body member 10; plunger 682 is then actuated to move the head 684 toward the front body member 10. The head 684 finally contacts the front side portion of the front body member 10. The label 666 is this attached to the front side portion of the front body member 10 and then released from the head 684.

Adjacent to the sticking device 680, there is provided a reader 694 to read the code 664 on the label 666 stuck on the front body member 10. The instruction of the code 664 read by the reader 694 is fed back to the printer 666 or controller 640 and then compared with the designated code. When the code 664 of the label 666 stuck on the front door member 10 matches the designated code, the front body is fed into the floor assembly line 100.

In practice, it is be understood that the code 664 is not always printed on the label. It may be embodied otherwise; for example, the code may be directly printed or formed on one of the parts of the vehicle body. However, employment of the label provides convenience and advantages for printing the code and attaching or removing of the same. The reader for reading the label 666 can be embodied in various forms. In the present embodiment, there is employed an optical reader using a laser.

At the downstream end of the labelling section, there is provided a reader 102 to read the code 664 on the label 666; reader 102 may be substantially same as the reader 694. The reader 102 reads the code 664 and modulates instruction signals from the code 664. The signal is fed to devices 104,106 of pre-assembling section 110 provided upstream of the floor assembly line 100, for removing the designated parts to be assembled into the floor assembly 18 corresponding to the designated vehicle body. As shown in FIG. 5, upstream of the pre-assembling section 110, there is provided a storage section 120 having a plurality of storage rooms 121,122,123 ... for storing various models of rear floor panels 14 and a storage section 130 having a plurality of storage rooms 131,132,133 ... for storing various models of front floor panels 12. Opposite to respective storage rooms 121,122, 123 ... and 131,132,133 ..., there are provided the devices 104,106 for taking out the designated rear floor panel 14 and front floor panel 12 from the storage sections 120 and 130, according to the instruction signals transmitted from the reader 102. The rear floor panel 14 taken out of the storage rooms 121,122,123 ... is processed through pre-assembling line 140, before it undergoes the assembling operation in the first line 100. The front floor panel 12 removed from the storage rooms 131,132,133 ... is also processed through a pre-assembly line 150, before it is subjected to assembling operation in the first line 100. Thereafter, rear floor panel 14 and front floor panel 12 are assembled in the floor assembly line 100 and then assembled into the floor assembly 18 together with the front body member 10 attached in the section 600. The first line 100 for assembling the floor assembly is constructed in any of various known manners. The assembling machines in line 100 can be arranged in a known manner. Though not clearly illustrated, the side members may be assembled to either the front or the rear floor members on the pre-assembly line.

Figure 10:
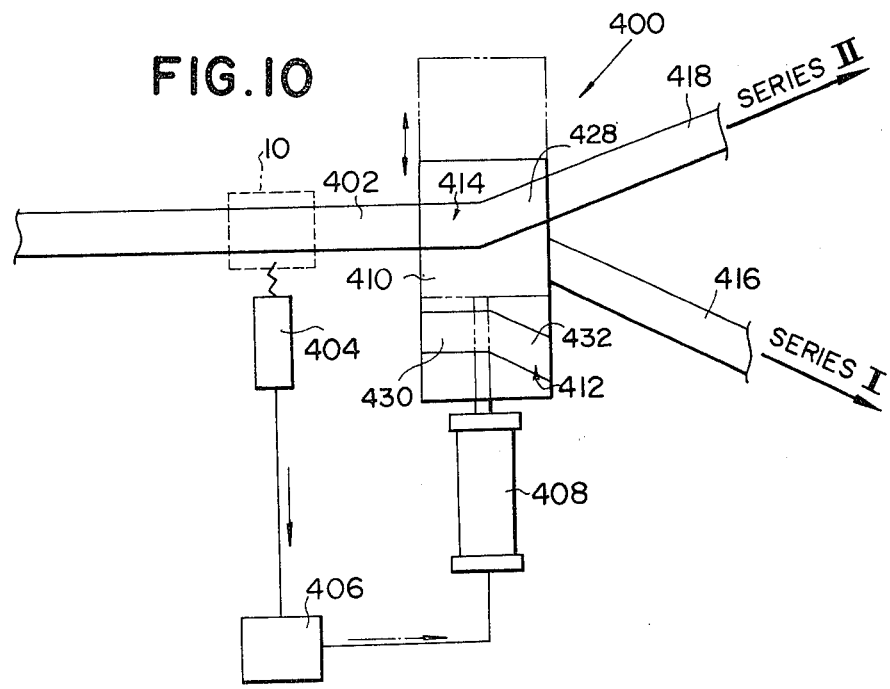
FIG. 10 is an enlarged schematic illustration of a point switching means of FIG. 5 for selectively connecting tracks of series of assembly lines.

As shown in FIG. 2, the floor assembly 18 assembled in the first section 100 is forwarded to one of two second body assembly line sections 200. As shown in FIGS. 1 and 10, downstream of the floor assembly line 100, there is provided a point switching means 400. Between the floor assembly line 100 and the point switching means 400, there is provided a reader 404 for the code printed on label 666 attached to front side portion of the front body 10 member which is now assembled on floor assembly 18. The reader 404 reads the code or label 666 to generate an instruction signal coupled to a controller 406 for a plunger 408 provided opposite to the junction 400. The plunger 410 is connected to an element 408 mounted on a pair of angled rails 412 and 414, FIG. 10, on element 10.

As shown in FIG. 10, the rails 412,414 are angled at a substantially longitudinal central portion thereof in opposite directions with respect to one another. Each angle of the rails 412,414 matches the angle defined by each pair of longitudinal axes of the tracks 402, 416 or 402, 418. Thus, when the rear portion 426 of the rail 414 is aligned with the track 402, as shown in thick line in FIG. 10, the front portion 428 of the rail 414 is aligned with track 418. When the element 410 is in the position shown by the dotted line in FIG. 10, the front and rear portions 432,430 of the rail 412 are respectively aligned with tracks 416 and 402.

The plunger 408 moves the element 410 from the first position to the second position or from the second position to the first position to connect either the rail 412 or rail 414 to the track 402. The plunger 408 is controlled by the controller 406 which generates an instruction signal for actuating the plunger 408 to move the element 410. The control for plunger 408 corresponds to the instruction involved in the code of label 666 stuck on the front side portion of the front body member 10 which is now assembled into the floor assembly 18 to be forwarded.

When, the floor assembly 18 passes through the portion of the track 402 where the reader 404 is provided, the reader 404 reads the code of the label and supplies a signal corresponding to the code to the controller 406. The controller 406 generates an instruction signal according to the instruction involved in the code so as to select either the track 416 or the track 418 to which the floor assembly 18 is forwarded. According to the instruction signal, the plunger actuates to move the element 410, as stated previously.

The floor assembly 18 is thus forwarded to either the track 416 of the first series I or the or the track 414 of the second series II so as to be processed and assembled according to designated procedure and designated parts in the instruction contained in the code.

Through the junction 400, the floor assembly 18 is forwarded to the body assembly line 200. Upstream of the body assembly line 200, there is provided a reader 202 (FIG. 5) for the code printed on the label 666 on the front side portion of the front body member 10 now being assembled into the floor assembly 18. The reader 202 senses an instruction signal from the code it reads on label 666. The signal is then supplied to a controller 204. The controller 204 generates a control signal for controlling side body member supply sections 210.

Figure 11:
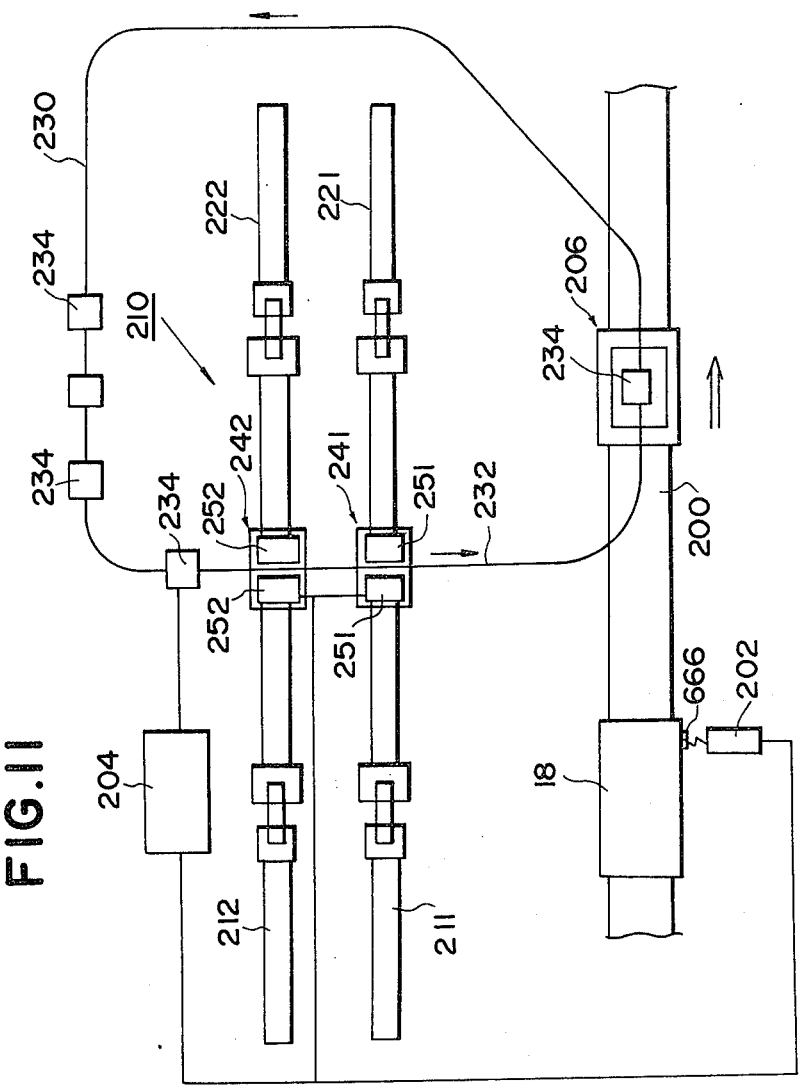
FIG. 11 is an enlarged schematic illustration of the body assembly line of FIG. 5.
Figure 12:
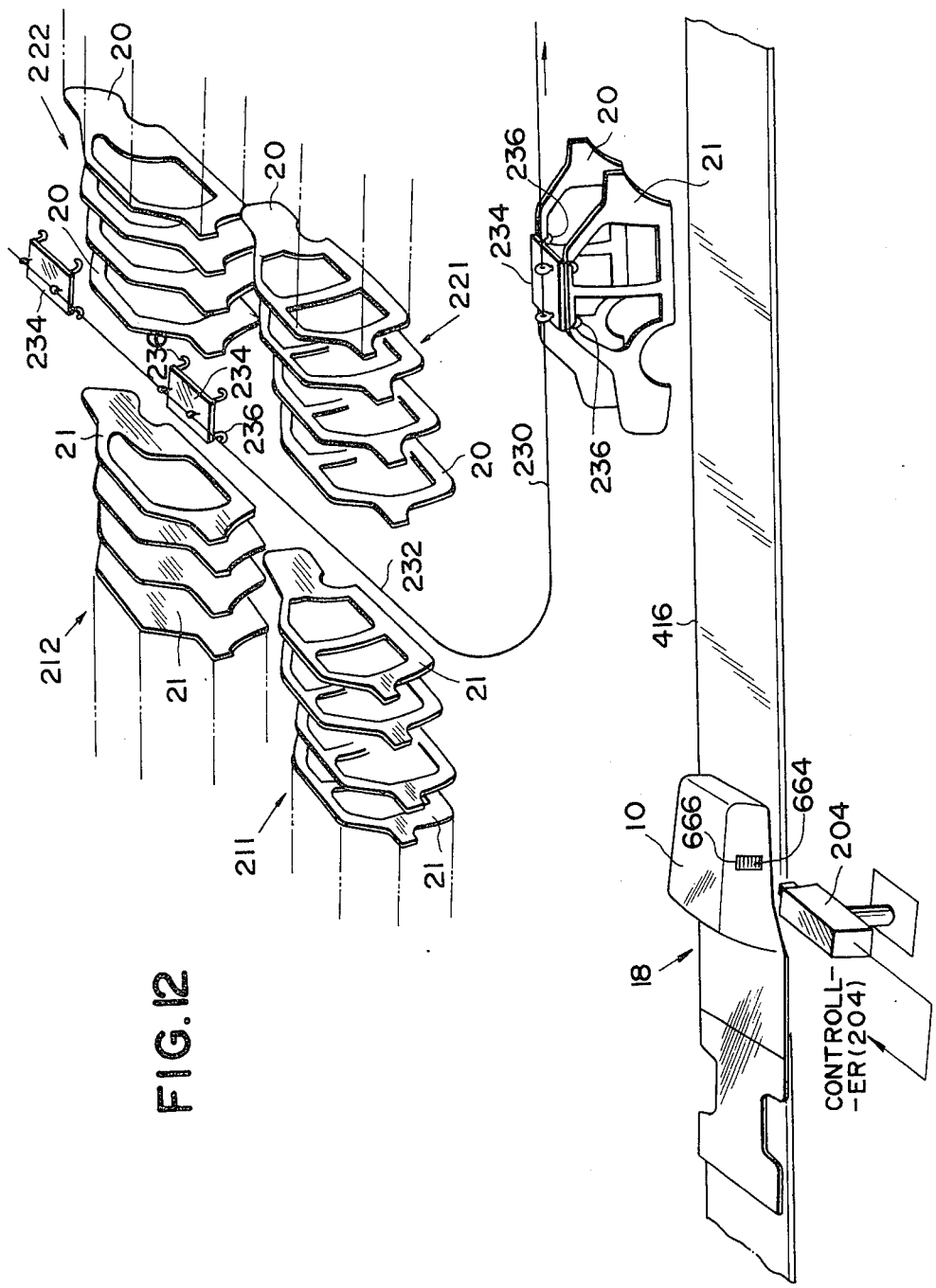
FIG. 12 is a schematic perspective view of the body assembly line of FIG. 5.

As shown in FIGS. 5, 11 and 12, the side body panel supply section 210 comprises opposed pairs of side body panel storage chambers 211, 212 ... and 221, 222 ... for storing the side body panels 20, 21 in sorted positions. The side body panels storage chambers 211, 212 ... and 221, 222 ... are provided in parallel relationship to the body assembly line 200 and the outlet of the storage chambers 211, 212 ... are opposite to the outlet of the storage chambers 221, 222 ... In respective side body member storage chambers 211, 212 ... , and 221, 222 ... , various models, for examples sedan model, hard-top model and so on, of the side body panels 20,21 are stored in order. In practice, it will be possible to independently store the side body panels in assorted position in each storage chamber. However it will be convenient and advantageous to store each sorted left side body panels in a chamber opposite to a chamber storing right side body corresponding thereto. In the side body storage chambers 211,212 ... and 221,222 ... , there is provided an endless track 230 having a portion 232 which laterally extends through the portions 241,242 ... between the outlets of the chambers 211, 212 ... and 221, 222 ... where hoisting device 251, 252 ... are provided. Along the track 230 a plurality of self-propelled lifter devices 234 are provided. Each lifter device 234 has a driving means so as to travel along the track 230. The driving means may be actuated under a control for providing given intervals between adjacent lifter devices 234. The lifter device 234 preferably cooperates with the track 416 so as to transfer the side body members 20, 21 in synchronism with the forwarding of the floor assembly 18. Each lifter device 234 has two pairs of hooks 236 to lift up respective side body panels 20, 21 and bring them to the assembling portion 206 of the body assembling section 200.

As shown in FIG. 11, the instruction signal detected by the reader 202 is transmitted to the portions 241, 242 ... to control the hoisting device 251, 252 ... for picking up designated side body panel 20, 21. The instruction signal from the reader 202 is also supplied to the controller 204 so for propelling of the lifter devices 234. The lifter devices 234 are controlled so they are propelled in synchronism with the operation of hoisting devices 251, 252 ....

On the side of side body panels supplying section 210 opposite from the body assembly line 200, there are provided a plurality of storage chambers 261, 262 ... respectively storing various types of roof panels 22, rear panels 24, cowl assemblys 26 (FIG. 4) which are often provisionally assembled with dash box member into cowl-dash subassembly and parcel-shelf members 28 (FIG. 3). The chambers 261, 262 ... may be grouped into several groups for storing respective parts independently. Adjacent to the outlets of each group of chambers 261, 262 ..., there are provided lifter devices 271, 272 ... for picking up the designated types of parts and bringing them to the assembly line 200. Respective lifter devices 271, 272 ... are controlled by a control signal detected by the reader 202, as shown in FIG. 5. Each of lifter devices 271 and 272 is operated in synchronism with the procedure of the assembling line 200 and with other lifter devices.

In the body assembly line, there are employed and arranged various types of assembling devices. For example, one of the known assembling devices to be applied in the body assembling line is disclosed in previously published and examined Japanese Patent application (Kokoku Tokkyo Koho) No. 53-21,542. In the publication No. 53-21542, there are generally disclosed and illustrated a method and an apparatus for assembling an automotive vehicle body structure. The method comprises the steps of: providing a vehicle body floor panel and a pair of body side panels; conveying the floor panel to a predetermined substantially horizontal working position; vertically suspending the side panels in a closely horizontally spaced condition; downwardly conveying the side panels and simultaneously gradually increasing the horizontal spacing between the side panels to position the side panels at a first temporary position above the working position and horizontally spaced parallel to each other and extending substantially parallel to the fore-and-aft direction of the floor panel; positioning the respective lower ends of the side panels laterally of the floor panel at predetermined lateral positions respectively on opposite sides of the floor panel; positioning the side panels longitudinally of the floor panel at predetermined fore-and-aft positions relative to the floor panel; tilting the side panels away from each other about the respective lower ends of the side panels to second temporary positions; moving the side panels laterally inwardly of the floor panel to position the side panels for welding the same to the floor panel; and welding the side panels to the floor panel to form a unitary vehicle body structure. An apparatus disclosed in the publication comprises: first conveying means for moving a floor panel into a substantially horizontal working position; jig means including at least one pair of elongated members which are rockable about respective axes located in the vicinity of the lower ends of the rockable members and extending substantially parallel to the fore-and-aft direction of the body structure to be assembled, the rockable members being rockable between substantially upright positions on both sides of the body structure to be assembled and inclined positions which are inclined away from each other about the axes; second conveying means for concurrently moving a pair of side panels downward into first temporary positions between and respectively adjacent the rockable member in the inclined position; first guiding and positioning means mounted on each of the rockable members and engageable with the lower end of the panel adjacent the rockable member for guiding the lower end of the side panel into a predetermined lateral position relative to the associated rockable member held in the inclined position thereof; manipulating means mounted on each of the rockable members and engageable with predetermined upper portion of the associated side panel for supporting the side panel with the lower end of the side panel held in the predetermined lateral position; second guiding and positioning means mounted on each of the rockable members and engageable with at least one predetermined portion of the associated side panel for guiding the side panel into a predetermined fore-and-aft position relative to the associated rockable member in the inclined position so that the side panels are moved into second temporary position; position holding means mounted on each of the rockable member and movable into locking engagement with the associated side panel in the second temporary position thereof, the rockable members being held in the inclined positions while the side panels are being moved from the first temporary positions and being moved from the inclined positions into the upright positions while the side panels are engaged by the position holding means for thereby moving the side panels into respective working positions ready to be welded to the floor panel in the working position thereof, and welding means for automatically welding the side panels to the floor panel.

It is clearly understood that in the present invention, the particular construction or arrangement and/or assembling devices to be employed in the line are not essential, therefore; the body assembly line described as an example can be embodied in any device or any arrangement of the device within a range.

Figure 13:
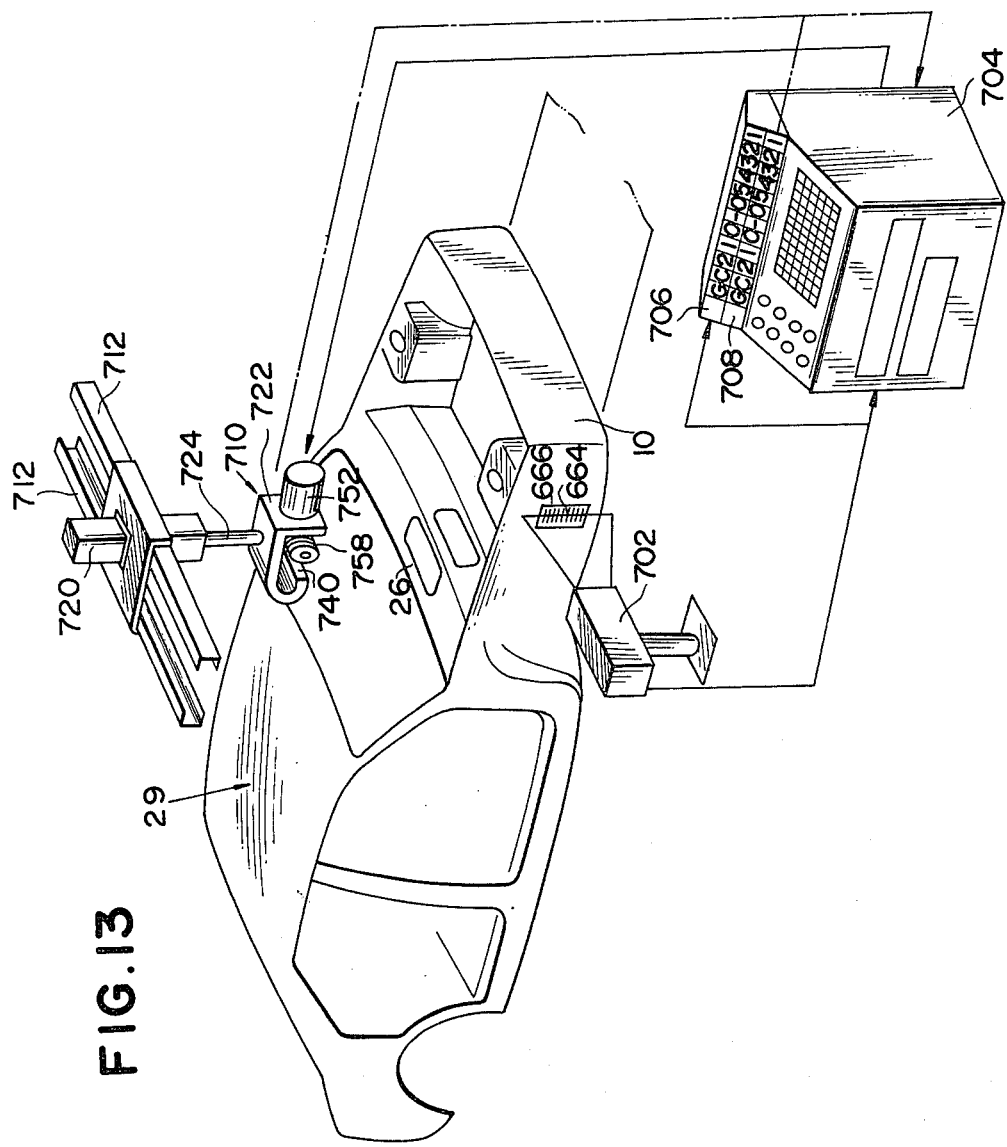
FIG. 13 is a schematic perspective view of a numbering section of FIG. 5.

Downstream of the body assembly line 200, there is provided a product number impressing section 700 for impressing a product number on the body assembly 29 forwarded from the body assembly line 200. As shown in FIGS. 5 and 13, at the inlet of the section 700, there is provided, adjacent track 416, a reader 702 for reading the code printed on the label 666 which is attached on the front body member 10 now being assembled into body assembly 29.

As shown in FIG. 13, the reader 702 reads the code 664 on the label 666 and derives a signal containing information of the product number. The information signal is fed into a controller 704. The controller 704 has display 706,708 to indicate the specific product numbers of the body assembly 29 to be impressed on the vehicle body. On the upper display 706, the specific number contained in the code 664 detected by reader 702 is indicated. The information signal including the information of the product number is fed from the controller 704 to a numbering device 710 to set the numbering elements of the numbering device 710 in accordance with the instruction of the information signal. After the setting operation, the numbering device 710 generates a feedback signal containing product number information set on the numbering device 710. The feedback signal is supplied to the controller 704 and indicated on the lower display 708. Workers at section 700 compare the numbers in upper and lower displays 706,708 respectively indicating the specific product numbers for confirmation. When the numbers indicated in the upper and lower display 706,708 match, then instruction signal for performing a numbering operation is transmitted to the numbering device 710.

If desired, comparing the information with respect to product numbers contained in the code and of set of models of numbering device for confirmation and instructing to carry out the impressing operation can be automatically performed by employing comparing means for electrically or mechanically comparing the numbers in the controller 704. For example, such comparing operation can be accomplished by a series of AND gates, such that one of input terminal of each gate is connected to upper display 706 and the other input terminal is connected to a corresponding lower display. The numbering device continues the product number setting operation until the output signal from the final AND gate is fed thereto.

As shown in FIG. 13, the numbering device is suspended from a pair of stationary rails 712 by a means for installing frame 714 which is fixedly engaged to the rails at both ends 716 thereof. The frame 714 has an aperture 718 at the central portion thereof so as to fixedly receive a cylinder 720 which may be electrically operated to move a main body 722 of the numbering device 710 corresponding to control signal from the controller 704. The main body 722 is connected at the lower end of a cylinder rod 724 of the cylinder to be moved up and down by the cylinder 720.

Figure 14:
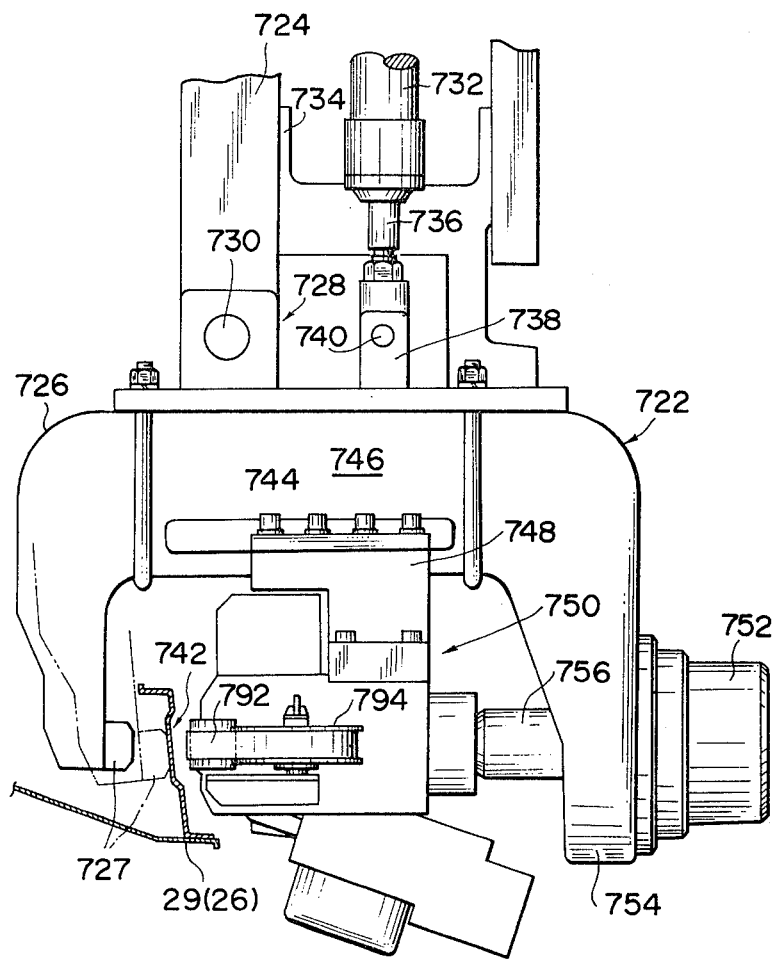
FIG. 14 is an enlarged side elevational view of a numbering device of FIG. 13.

As shown in FIG. 14, the main body 722 of numbering device 219 has a substantially C-shaped yoke 726 which is connected to the cylinder rod 724 by means of pin-joint 728 so as to rotate about an axle 730 with respect to the rod 724. A sub-cylinder 732 is fitted to a lower portion of the rod 724 through a bracket 734. The cylinder rod 736 of the sub-cylinder 732 is also connected to the yoke 726 through a bracket 738 so that the yoke 726 can be rotated about an axle 740 with respect to the rod 736. Thus, the yoke 726 can be rotated about the axle 730 to the position shown by the dotted line in FIG. 14, when the sub-cylinder 732 is actuated to pull up the yoke 726. Then, the free end 727 of the yoke 726 contacts a portion 742 of the body assembly 29. In the preferred embodiment, the product number is impressed on cowl assembly 26. Therefore, the end 727 is pressed against the portion 742 of the cowl assembly 26.

The yoke 726 is provided with a slit or recess 744 at the portion 746 of substantially C-shaped configuration to suspend a numbering element 750 therefrom through a bracket 748 so that the element 750 can move therealong together with the bracket 748. The yoke 726 is further provided with a cylinder 752 on the portion 754. The end of the cylinder rod 756 of the cylinder 752 is connected to the numbering element 750 so as to move the element 750 along the slit or recess 744 to and fro with respect to the portion 742. The numbering element 750 is thus movable to and fro with respect to the portion 742 of the cowl assembly 26.

Figure 15:
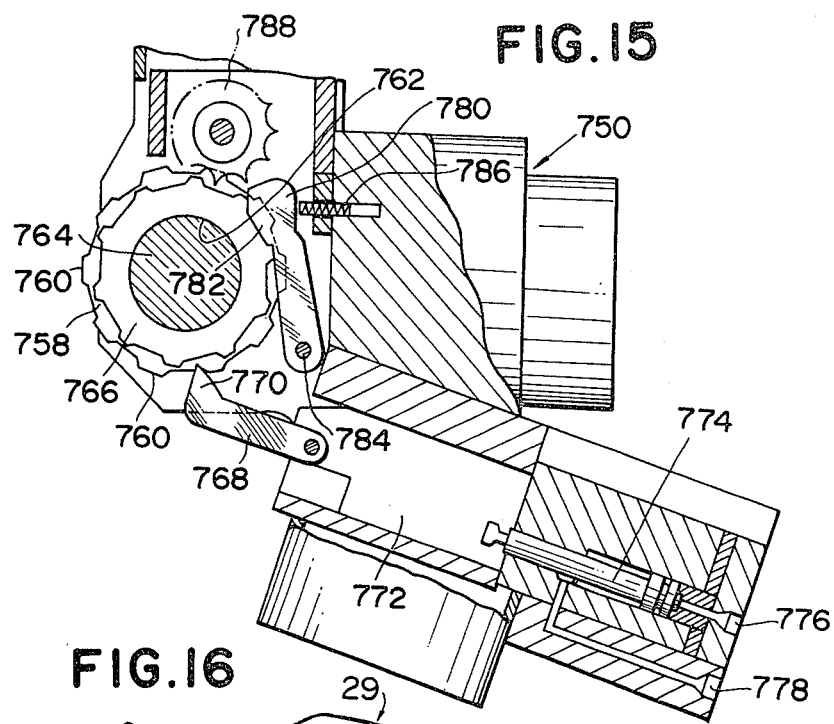
FIG. 15 is a partial, sectional side elevational view of the numbering device of FIG. 13.

As shown in FIG. 15, the numbering element 750 comprises a plurality of wheels 758, each having a plurality of projections 760 respectively defining numbers and/or letters. Each numbering wheel 758 is formed with an aperture 762 at the center thereof. The numbering wheels 758 are aligned so that the aperture 762 thereof is aligned to receive an axle 764 therethrough. Each roller 758 is independently rotatable about the axle 764, with respect to one another. Each roller 758 is fixedly fitted with a gear 766 which is also rotatable about the axle 764. Each gear 766 is selectively engaged by a lever 768 having a claw 770 on one end thereof for engagement with the gear 766. The other end of each lever 768 is pivoted at a plunger head 772 of a hydraulic plunger 774 which is provided with ports 776, 778 for discharging working liquid of the plunger 774. A source (not shown) for supplying the working liquid to the plunger 774 may include an electric actuation means operated by the control signal corresponding to the code 664 and involving an instruction relating to product numbers. The working liquid is supplied to the port 776 of plunger 774 to move the plunger heat 772 forward and thus, to move the lever 768 forward so as to rotate gear 766 which is attached to numbering wheel 758. Supplying the working fluid to the port 778 causes plunger 774 to move backward in plunger head 772, thus moving the lever 768 backward. Repeated forward and backward movement of the plunger head 772 by lever 768 causes numbering wheel 758 to be rotated in sequence so as to align model faces respectively defining designated numbers of letters.

Each gear 766 also engages a stopper lever 780 having a claw 782 on one end thereof for engagement with the gear 766. The lever 780 prevents reversed rotation of gear 766. The lever 780 is pivoted to the body of the numbering element so the lever can rotate about an axle 784; the lever is also biased toward the gear 766 by a resilient spring member 786, one end of which is fixedly secured on the body.

A counting gear 788 is further engaged by each gear 766 so as to measure the amount of rotation of the gear 766 and thus detect each figure 760 to be impressed. The counting gear 788 is connected through an axle 790 to a means (not shown) for measuring the amount of rotation of the gear 788 and thus for detecting all of the figures to be impressed on the cowl assembly. The counting means generates the feed-back signal supplied to the controller 704; this signal containing information relating to the numbers or letters to be impressed. Due to the feed-back signal from the counting means, the controller 704 indicates a product number to be impressed on the lower display 708.

Though in the present embodiment there are employed counting gears 788 and the counting means for detecting model faces positioned at the impressing portion, it will be apparent that detecting of the positioning of the model face may be embodied or modified otherwise. For example, the model face can be detected by counting motions of the plunger head.

When, the group of letters and/or numbers of the rollers 758 aligned at the impressing portion is matched with the designated product number specified in the code 664 of the label 666, the controller generates an instruction signal for carrying out the numbering operation. Initially, the cylinder 720 starts to move down the main body 710 toward a portion 742 of the body assembly 29 to be impressed with the product number. After the main body 710 is opposite to the portion 742 of the cowl assembly 26 of the body assembly, the sub-cylinder 732 starts to move the yoke 726 upward, thereby rotating the yoke counterclockwise (as viewed in FIG. 14) about the axle 730. Thereby, the end 727 of the yoke 726 contacts the portion 742 of the cowl assembly. Thereafter, the horizontal cylinder 752 starts to move the numbering element 750 along the slit or recess 744 of the yoke 726 in a substantially horizontal direction so as to impress the product number on the portion 742.

As the product number is impressed, a tape 792 for receiving the engraved printing of impressed product number is supplied. The product number is engraved on tape 792 simultaneously with the number impressing operation. The tape 792 is wound around a spool 794 in a series.

Figure 16:
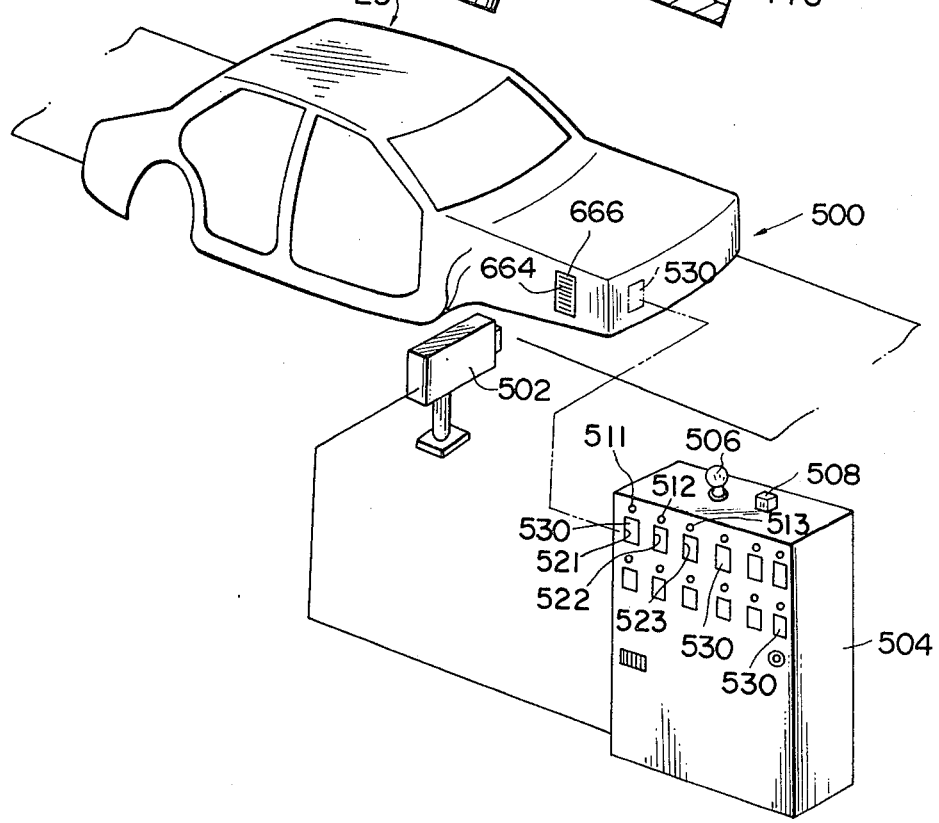
FIG. 16 is a partial perspective view of the special treatment line of FIG. 5.

As shown in FIG. 5, the body assembly 29 is forwarded through the numbering section 700 to the special treatment line 500. As shown in FIG. 16, upstream of the special treatment line 500, there is provided a reader 502 for reading the code 664 of the label 666. The reader 502 supplies information signals to a controller 504. The controller 504 is provided with a indicator lamp 506 and a notifying buzzer 508. The controller 504 is further provided with a plurality of lamps 511,512 . . . to display the kind of treatment in the line 500 and a plurality of card stackers 521,522 . . . storing instruction cards 530 and respectively corresponding to the lamps 511, 512 . . .

When, a body assembly 29 passing through the line 500 requires special treatment in the line 500 and the code 664 of the label 666 indicates the nature of the special treatment, the lamp 506 lights or flashes and, at the same time, buzzer 508 sounds to inform the workers that the body assembly requires special treatment. Corresponding to kinds of treatment designated in the code, lamp or lamps 511, 512 . . . light to indicate what treatment is required. A worker then takes out one or more instruction cards 530 from the card stockers 521, 522 . . . corresponding to lit lamps 211, 212. . . The cards are stuck on the body assembly 29. In the line 500, designated special treatment can be easily performed in accordance with the instruction indicated in the cards.

As shown in FIGS. 1 and 5 after going through the special treatment line 500, the body assembly 29 is forwarded to the body assembly finishing line 300. Upstream of the line 300, there is provided a reader 302 for reading the code of the label containing information of respective parts to be assembled to the body assembly 29 and instruction for assembling. The reader 302 generates an instruction signal to be fed into a controller 304.

A plurality of parts storage chambers 311, 312, 313 . . . are provided in parallel relationship with respect to one another. Various kinds of front fender members 30, front door members 32, rear door members 34, hood members 36 and trunk lid members 38 (FIG. 4) are stored within the storage chamber 311, 312, 313 . . . in assorted positions. At the outlets 321, 322, 323 . . . of each group of the staorage chamber 311, 312, 313 . . . where each part type is stored, there is provided a hoisting device 331, 332, 333 . . . for picking up each designated part. The hoisting devices 331, 332, 333 are respectively controlled by control signals containing information of designated models and specifications of the parts to be assembled to the body assembly 29.

An endless conveying means 340, such as a belt conveyor, is provided between the storage section 310 and the assembly line 300. The conveying means 340 has portions 342, 344 respectively positioned on both sides of the line 300 in parallel relationship to the line 300. The conveying means 340 has a further portion 346 opposite to the storage section 310.

In the present embodiment, the conveying means 340 is arranged in substantially channel-shaped configuration and is driven in a clockwise direction.

Figure 17:
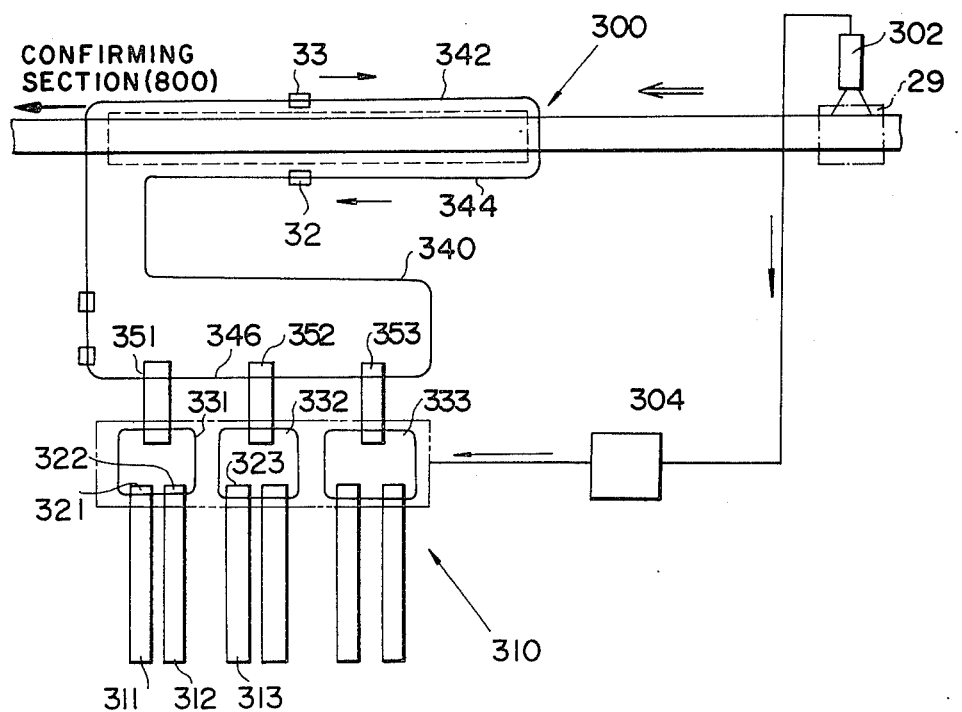
FIG. 17 is a schematic illustration of the additional equipment assembly line in FIG. 5.

Between respective hoisting device 331, 332, 333 . . . and the portion 346 of the conveying means 340, there are provided lifting devices 351, 352, 353 . . . for transporting parts respectively picked up by the hoisting device to the portion 346. The lifting device 351, 352, 353 . . . may be operated in synchronism with the conveying means 340 so as to arrange respective parts conveniently for the assembling operation. In other words, the lifting devices 351,352,353 . . . are respectively operated in a given timing, for example symmetrical parts such as left side front door member 32 and right side front door member 33 are transported to the conveying means 340 in a given timing so that they are positioned symmetrically with respect to the line 300 at the portion 342, 344 to be assembled to the body assembly, as shown in FIG. 17. Thus, both front door member can be assembled to the body assembly 29 simultaneously.

After finishing assembling operation in the line 300 and thereby completing the vehicle body assembling operation in the system, the vehicle body 29 is forwarded to a printing section and an interior finishing section. As shown in FIGS. 5 and 18, downstream of the line 300, there is provided a checking section 800 in which the assembled vehicle bodies are checked according to the designated models and/or specifications of the vehicle bodies. The checking may be made by comparing the assembled vehicle bodies with the designation contained in the code 664. At the same time, the information of the models and specifications contained in the code 664 is fed to the printing section and/or interior finishing section.

In the checking section 800, there is provided a reader 802 for reading the code 664 of the label 666. The reader 802 generates an information signal corresponding to the code 664 to be fed to, for example, central and main control section controlling the printing section. Further, the information signal may be fed into the checking means (not shown) in the checking section to be compared with the information of the models and specifications of the assembled bodies detected by the checking means, for confirmation. After confirmation, the instruction signal generated by the reader 802 or checking means is fed into a label removing device 804 having a magnetic head 806 to magnetically attract the label 666 and remove the same from the front body member which is assembled into the vehicle body.

Thereafter, the vehicle body is gripped by arms 810 of a movable lifter 812 which is suspended from a rail 814 and which is supported by frame 816. The frame 816 is movable up and down along stationary frames 818 by driving means (not shown). The lifter 812 grips the vehicle body with the arms 810 at lowered position, as shown in FIG. 18. Then, the movable frame 816 is moved up so it rides from rail 814 to the rail 820 that extends the next section. The lifter 812 can thus travel along the rail to the next section so as to bring the vehicle body thereto. In the present control system, as the information and instruction with respect to models, standards and specifications are accompanied with respective vehicle bodies to the assembly lines and are read before entering into each assembly line, there may be expected the following advantages:

(1) since the information and instruction are carried with the corresponding vehicle body, conformity is assured between the vehicle body forwarded to the line to be assembled and the information instructions therefor;

(2) since there is no limitation relating to the sequence of forwarding the bodies into the assembly lines, the the order can be easily changed according to necessity;

(3) if one of the assembly lines encounters trouble or damage or an accident, other lines are not be very seriously affected or stopped.

(4) the work load of the workers is reduced because they need not compare the instructions or information with respect to models, standards and specifications of the vehicle body and the body to be assembled; as the information and instructions are read by a machine, there may be an increase in the reliability of the assembling operation; and (5) since this control system does not require a large computer and/or complicated computerized control system, it can reduce the cost for the facility of the control system.

It should be understood that what is described and illustrated in detail above principally refers to a system for assembling vehicle bodies, particularly to a control system for the vehicle body assembly lines, and the principles of the present invention can be applied to other assembly lines in the automotive vehicle manufactories. In order to implement control systems in each automotive vehicle component assembly lines, it may merely require substantially similar means and elements of the controlling system as hereinbefore described and not require serious changes or revision of the assembly line per se.

Further, although the present invention has been shown and described with respect to the preferred embodiment, it should not be considered as being limited to these or mere and simple generalizations or other detailed embodiments. Yet further alterations can be made to the form and the details of any particular embodiment without departing from the principles of the present invention. Therefore, it is desired that the scope of the present invention and the breadth of the protection sought to be granted by Letters Patent, should be defined solely by the accompanying claims.

What is claimed is:

1. In an automotive vehicle component assembling system having at least one series of assembling lines used in common for assembling various model, standards and specifications of the vehicle components, a system for controlling one of said assembling lines comprising:

a first means for obtaining information and instructions in relation to the vehicle component to be assembled in order and at a given interval and generating an electric signal representative of the obtained information and instructions of the vehicle component to be assembled;

a second means for receiving said electric signal fed from said first means and converting the electric signal into photoelectrically sensible sign which is printed on a label;

a third means for sticking said label onto a part of said vehicle component and for reading said sign on the label to convert the same to the electric signal fed back to the first means for confirmation, and a fourth means for reading said sign on the label and obtaining necessary information and instructions and for converting the obtained information and intructions into a control signal for identifying a part of the vehicle component to be picked up and for controlling assembling operations performed in said one assembling line.

2. In an automotive vehicle component assembling system having at least one series of assembling lines in common for assembling various models, standards and structures of the vehicle components, a system for controlling the assembling system comprising:

a first means for obtaining information and instructions with respect to the vehicle component to be assembled from a medium fed thereto in order and at a given interval, which medium contains the information and instructions of the vehicle component to be assembled and is in a form of punched card, said first means converting the obtained information and instructions into an electric signal;

a second means for receiving said electric signal from said first means and for converting the electric signal into photoelectrically sensible sign which is printed onto a label;

a third means for sticking said label onto a part of said vehicle component and for reading said sign on the label to convert the same to the electric signal to be fed back to the first means; said third means including means for comparing the read sign with the electric signal generated in the first means to check whether both of signals are matched together; and a fourth means for reading said sign on the label and for converting the obtained information and instructions from said sign into a control signal for identifying a specific part of the vehicle component and for controlling assembling operations of each individual assembling line.

3. In an automotive vehicle component assembling system having at least one series of assembling lines in common for assembling various models, standards and specifications of the vehicle component, a system for controlling the assembling system comprising:

a first means for reading information and instructions relating to the vehicle compartment to be assembled from a punched tape sequentially fed thereto and including the information and instruction of the vehicle component to be assembled in order and at a given interval, said first means generating an electric signal representative of the read information and instructions of the vehicle component;

a second means responsive to said electric signal derived from said first means for converting said electric signal to a bar-code sign which is printed onto a label adapted to be magnetically fitted onto a part of the vehicle component; said second means generating an electric signal representative of the information and instructions read from the bar-code sign, means for feeding the electric signal generated by the second means back to the first means; said first means including means for comparing electric signals generated in the first and second means for confirmation;

a third means for magnetically picking up and sticking the label onto the part of the vehicle component and for reading the bar-code sign on the label to generate an electric signal; means for feeding back the electric signal generated by the third means to said first means; said first means including means for comparing the electric signals generated in the first and third means; and a fourth means provided in each individual assembling line to read out the information and instructions of the vehicle component to be assembled for identifying the specific part of the vehicle component and for controlling the assembling operation performed in each individual assembling line.

4. A control system as recited in claim 1, 2 or 3, wherein said sign also includes an information of product number to be applied to the vehicle component.

5. A control system as recited in claim 1, 2 or 3, wherein said sign can be read by means of a photoelectrical process.

6. A control system as recited in claim 5, wherein said signs is contained on a label which can be stuck on the parts of the vehicle component.

7. A control system as recited in claim 5, wherein each assembly line obtains information and/or instructions from said signs before entering the vehicle component to be assembled thereinto.

8. A control system as recited in claim 7, in each assembly line, said photoelectrically sensitive signs being converted into electric control signals for electrically controlling picking up parts, supplying the same into the line and performing assembling operation.

9. A control system as recited in claims 8, wherein said first means comprises a reader for reading the information and instruction for controlling said assembly lines and a code printer 670 receiving information and/or instruction and converting the same into a sign to be printed.

10. A control system as recited in claim 9, wherein said printer prints a specific bar code comprising a plurality of thick lines and thin lines in combination, containing necessary information and/or instructions on a label to be stuck on one of the parts of the vehicle component.

11. A control system as recited in claims 1, 2 or 3, wherein said sign 666 is contained on a label 666 which can be stuck on the parts of the vehicle component.

12. A control system as recited in claim 1, 2 or 3, wherein each assembly line obtains information and/or instructions from said signs before entering the vehicle component to be assembled thereinto.

13. A control system as recited in claim 12, in each assembly line, said signs being converted into control signals for automatically controlling picking up parts, supplying the same onto the line and performing assembling operation.

14. A control system as recited in claim 1, 2 or 3, wherein are provided various instruction papers 530 containing information with respect to required operation and signs 664 containing information for designating one of the instruction papers therefrom.

15. A control system as recited in claim 1, 2 or 3, wherein said third means comprises a reader provided upstream of each assembly line and reading said code, and a controller associated with said reader to generate control signals for controlling selection of necessary parts and controlling assembling operation.

16. A control system as recited in any one of claim 15, wherein said label is provided with a magnetic member on the back thereof so as to magnetically attract to the parts of vehicle component.

17. A control system as recited in claim 16, wherein said magnetic member is magnetic rubber.

18. A control system as recited in claim 1, 2 or 3, where, between said first line and said second line, there is provided a point constabling means on which each vehicle body to be assembled is selectively forwarded to a series of assembly lines performing designated assembling operation.

19. A control system as recited in claim 18, wherein said point constabling means includes a reader for reading said code contained on the vehicle body so as to select series of assembly lines, which the vehicle body is forwarded.

20. A control system as recited in claim 1, 2 or 3, between said second line and said third line, there is provided a product number impressing means comprising a plurality of numbering rollers each having a plurality of models defining numbers or letters and an actuating means for impressing the numbering rollers on to the vehicle body.

21. A control system as recited in claim 20, wherein said product number impressing means includes a reader for reading a code contained on the vehicle body, and is controlled by information or instruction with respect to the product number contained on the code.

22. A control system as recited in claim 20, wherein said product number impressing means comprises:
 a numbering element having said numbering rollers and the actuating means for impressing the numbering rollers onto the vehicle body;
 a hoisting means connected with the numbering element for moving the numbering element up and down; and
 a driving means to rotate the numbering element with respect to the vehicle body.

23. A control system as recited in claim 1, 2 or 3, wherein said series of assembly lines includes a line for performing special treatment which is required on the vehicle body of special models, standards and/or specifications.

24. In an automotive vehicle component assembling system having at least one series of assembling lines in common for assembling various models, standards, specifications of the vehicle component,
 a method for controlling the assembling line comprising:
 obtaining information and instructions from a medium containing all the information and instructions therein; feeding the medium in sequence and deriving the information and instructions in order of the vehicle component to be assembled and at a given interval;
 generating an electric signal representative of the derived information and instructions with respect to the vehicle component to be assembled;
 converting the electric signal into a bar-code sign which is photoelectrically sensible; printing the bar-code sign onto a magnetically stickable label;
 sticking the label onto a part of the vehicle component which is identified by the information and instructions in the bar-code sign;
 reading out the information and instructions from the bar-code sign in each individual assembling line and converting the read out information and instructions into a control signal for identifying parts to be assembled to the designated vehicle component and controlling the assembling operation performed in the assembling line.

25. A method as set forth in claim 24, further comprising (a) generating an electric signal representing the information and instructions read out from the bar-code sign, and (b) comparing the signal representing information and instructions from the bar-code sign with the signal representing the information and instructions obtained from said medium for confirmation, said steps (a) and (b) being performed between the steps sticking the label onto the part of the vehicle component and reading out the information and instructions in each individual assembling line.

26. A method as set forth in claim 24 or 25, wherein said method further comprises selecting an assembling line according to the information and instructions requiring the special treatment.

27. An automotive vehicle body assembling system comprising:
 a first means for obtaining information and instructions identifying a model, standard and specification of the vehicle body to be assembled and for identifying the parts forming the identified vehicle body, which information and instructions relating to the vehicle body to be assembled are contained in a dynamic tape medium sequentially fed to said first means and containing the information and instructions in order of assembling of the vehicle body and at a given interval, said first means including means for converting the obtained information and instructions to a photoelectrically sensible bar-code sign, means for printing the bar-code sign onto a label, said first means generating an electric signal representative of the information and instructions of the vehicle body, said electric signal identifying a floor assembly for the identified vehicle body, said electric signal containing bar-code information to be stuck to the printed label;
 a second means for feeding the floor assembly containing the label to a series of assembly lines including a body assembly line and a body finishing line;

a third means provided in the body assembly line, which third means reads out the information and instructions contained in the bar-code and generates a control signal for identifying parts to be assembled to the floor assembly and for controlling the assembling operation performed in the body assembly line; and a fourth means provided in the body finishing line for reading out the information and instructions from said bar-code and generating a control signal for identifying the parts to be assembled to the body assembly fed thereto and for controlling the assembling operation performed in the body finishing line.

28. A system as set forth in claim 27, wherein said system comprises a plurality of series of assembling lines each of which comprises a floor assembly line, a body assembly line and a body finishing line, said second means including means for selecting one of the series of the assembling lines based on the information and instructions obtained from the bar-code.

29. A system as set forth in claim 28, wherein said system has only one floor assembly line which acts as a common line for the plurality of series of assembling lines, said second means including a junction for selectively feeding a partially assembled automobile as derived from the floor assembly line to the designated series of the assembling lines.

30. A system as set forth in claim 29, wherein said junction comprises a movable element movable responsive to a control signal representative of the identification of the designated series of assembling lines, means for reading the identification from the bar-code sign on the label, said movable element connecting the floor assembly line to the trailing assembling lines identified by the bar-code.

31. A system as set forth in claim 27, wherein a product number indication means is provided downstream of the body assembly line, said product number indication means reading out the information relating to the product number from said bar-code on the label and generating a control signal representative of the designated product number, and a numbering device impressing the designated product number in response to the control signal representative of the designated product number.

32. A system as set forth in claim 31, wherein said numbering device generates an electric signal representative of the product number to be impressed and said product number indication means includes means for comparing the fed back signal from said numbering device with the designated product number read from the bar-code sign on the label.

33. A system as set forth in claim 31 or 32, wherein said numbering device comprises a numbering element having a plurality of numbering rolls co-axially aligned to one another and an actuator for impressing the numbering rolls onto the vehicle body, a hoisting means connected with the numbering element for moving the numbering element up and down, and a driving means for rotating the numbering rolls according to the identification of the product number represented by the control signal.

34. A system as set forth in claim 27, wherein said system further includes means for confirming the assembled vehicle body with the specific model, standard and specification given by the bar-code sign on the label downstream of the body finishing line.

35. A method of controlling the assemblage of automobiles in an assembly system including in series a floor assembly line, a body assembly line, a special treatment line and a body finishing line, different parts for different automobile models being stored at the floor and body lines, comprising preparing a sign for each automobile, said sign including machine readable indicia associated with different parts from the floor and body assembly lines to be included in a particular automobile, as well as from the body finishing line and operations to be performed at the special treatment line; at the floor assembly line securing the sign to a common part of each automobile assembled in the assembly system, reading the machine readable indicia at the floor assembly line from the sign on the common part of a particular automobile to derive a first control signal, responding to the first control signal to select which parts are to be assembled on the particular automobile at the floor sub-assembly line, assemblying the parts selected at the floor assembly line onto the part containing the sign, conveying the automobile as partly assembled at the floor assembly line to the body assembly line; reading the machine readable indicia at the body assembly line from the sign on the common part of the particular automobile to derive a second control signal, responding to the second control signal to select which parts are to be assembled on the particular automobile at the body assembly line, assemblying the parts selected at the body assembly line onto the partly assembled automobile conveyed to the body assembly line, conveying the automobile as partly assembled at the body assembly line to the special treatment line; reading the machine readable indicia at the special treatment line from the sign on the common part of the particular automobile to derive a third control signal, responding to the third control signal to select which treatments are to be performed on the particular automobile at the special treatment line, performing the selected treatment at the special treatment line, conveying the automobile as partly assembled at the special treatment line to the body finishing line; reading the machine readable indicia at the body finishing line from the sign on the common part of the particular automobile to derive a fourth control sign, responding to the fourth control signal to select which parts are to be assembled on the particular automobile at the body finishing line, and assemblying the parts selected at the body finishing line onto the partly assembled automobile conveyed to the body finishing line.

36. The method of claim 35 wherein the assembly system includes N body assembly lines, where N is an integer greater than one, a separate special treatment line for each of the body assembly lines, a separate body assembly finishing line for each of the special treatment lines, each of the body assembly lines, the special treatment line and body assembly finishing line being controlled in response to the signals read from the sign on the particular automobile, and a device for routing of the partially assembled automobiles conveyed from the floor assembly to selected ones of the N body assembly lines; the method further comprising reading the machine readable indicia from the sign on the common part of a certain automobile to derive a fifth control signal, and controlling the routine device in response to the fifth control signal to convey the certain automobile to one of the N body assembly lines.

37. The method of claim 35 further comprising reading the machine readable indicia from the common part to derive an indicia indicating signal while the particular partially assembled automobile is at the floor assembly line and prior to other parts assembled on the common part at the floor assembly line, writing the indicia onto the sign in response to a sixth signal derived from a storage medium, and enabling parts to be assembled on the common part only in response to the fifth and sixth signals indicating that the indicia written on the sign and in the storage medium being for the same operations at the floor and body assembly lines, at the special treatment line and at the equipment assembly line.

38. The method of claim 35 further comprising conveying the automobile as assembled at the body finishing line to a further section of the assembly line, reading the indicia from the sign on the common part of the particular automobile at the further section to derive a further signal, and controlling an operation on the particular automobile at the further section.

39. The method of claim 38 wherein the further section is a section for printing a human readable label and for affixing the label to a part of the automobile.

40. The method of claim 38 wherein the further section is an interior assembly section.

41. A method of assemblying automobiles on an assembly system including plural assembly lines through which a particular automobile passes in series, there being provided at a first of the assembly lines a common part of every automobile being assembled, different other parts being applied to the common part at the first assembly line, different further parts and steps being applied to and performed on a partially completed automobile at the other assembly lines, the method comprising preparing a sign for each automobile to be assembled, said sign including machine readable indicia associated with parts to be assembled and operations to be performed at the first and other assembly lines, at the first assembly line securing the sign to the common part of each automobile assembled in the system; at each assembly line where parts are assembled: reading the machine readable indicia from the sign on the common part of a particular automobile to derive a control signal, responding to the control signal to select which parts are to be assembled on the particular automobile at the assembly line, assemblying the parts selected at the assembly line onto the partially assembled automobile at the assembly line; at each assembly line where an operation is performed: reading the machine readable indicia from the sign on the common part of the particular automobile to derive an additional control signal, and performing selected operations on the particular automobile in response to the additional control signal.

* * * * *